United States Patent
Chan

(10) Patent No.: US 9,467,372 B2
(45) Date of Patent: Oct. 11, 2016

(54) METHODS AND SYSTEMS FOR PROCESSING INTERNET PROTOCOL PACKETS

(71) Applicant: Pismo Labs Technology Limited, Hong Kong (HK)

(72) Inventor: Sze Hon Chan, Hong Kong (HK)

(73) Assignee: PISMO LABS TECHNOLOGY LIMITED (HK)

( * ) Notice: Subject to any disclaimer, the term of this patent is extended or adjusted under 35 U.S.C. 154(b) by 54 days.

(21) Appl. No.: 14/369,721

(22) PCT Filed: Nov. 26, 2013

(86) PCT No.: PCT/IB2013/060402
§ 371 (c)(1),
(2) Date: Jun. 30, 2014

(87) PCT Pub. No.: WO2015/079284
PCT Pub. Date: Jun. 4, 2015

(65) Prior Publication Data
US 2015/0146725 A1 May 28, 2015

(51) Int. Cl.
*H04L 12/741* (2013.01)
*H04L 12/28* (2006.01)

(52) U.S. Cl.
CPC .......... *H04L 45/74* (2013.01); *H04L 12/2854* (2013.01)

(58) Field of Classification Search
CPC ....... H04L 45/00; H04L 45/02; H04L 45/22; H04L 12/4604; H04L 41/12; H04L 67/1061; H04W 40/00
See application file for complete search history.

(56) References Cited

U.S. PATENT DOCUMENTS

| | | | | |
|---|---|---|---|---|
| 6,826,623 | B1 * | 11/2004 | Brown | H04L 29/12009 709/239 |
| 7,174,376 | B1 * | 2/2007 | Daruwalla | H04L 12/2801 370/350 |
| 2001/0017857 | A1 * | 8/2001 | Matsukawa | H04L 29/12018 370/392 |
| 2006/0090093 | A1 * | 4/2006 | Goedde | G06F 11/2294 714/4.4 |
| 2007/0110046 | A1 * | 5/2007 | Farrell | H04L 69/04 370/389 |
| 2008/0112362 | A1 * | 5/2008 | Korus | H04L 29/12811 370/331 |
| 2008/0117902 | A1 | 5/2008 | Vinneras | |
| 2015/0146725 | A1 * | 5/2015 | Chan | H04L 12/2854 370/392 |

FOREIGN PATENT DOCUMENTS

| | | |
|---|---|---|
| CN | 102217253 A | 10/2011 |
| CN | 102571970 A | 7/2012 |
| CN | 103004146 A | 3/2013 |

OTHER PUBLICATIONS

International Search Report in International Application No. PCT/IB2013/060402, mailed on Dec 2, 2014.
Written opinion of the International Searching Authority in International Application No. PCT/IB2013/060402, mailed on Dec. 2, 2014.

* cited by examiner

*Primary Examiner* — Sulaiman Nooristany

(57) ABSTRACT

A method carried out by a network node using in a system for forwarding IP packets. When the network node receives an IP packet from a first network interface, the network node determines whether the destination address of the IP packet matches an IP address in the IP address section of a first routing rule. If the destination address of the IP packet matches the IP address in the IP address section of the first routing rule, the network node forwards the IP packet to a second network interface. The first routing rule comprises at least one IP address section and at least one network interface section. One or both of the first network interface and the second network interface is not assigned with an IP address. The network node comprises at least three network interfaces.

20 Claims, 6 Drawing Sheets

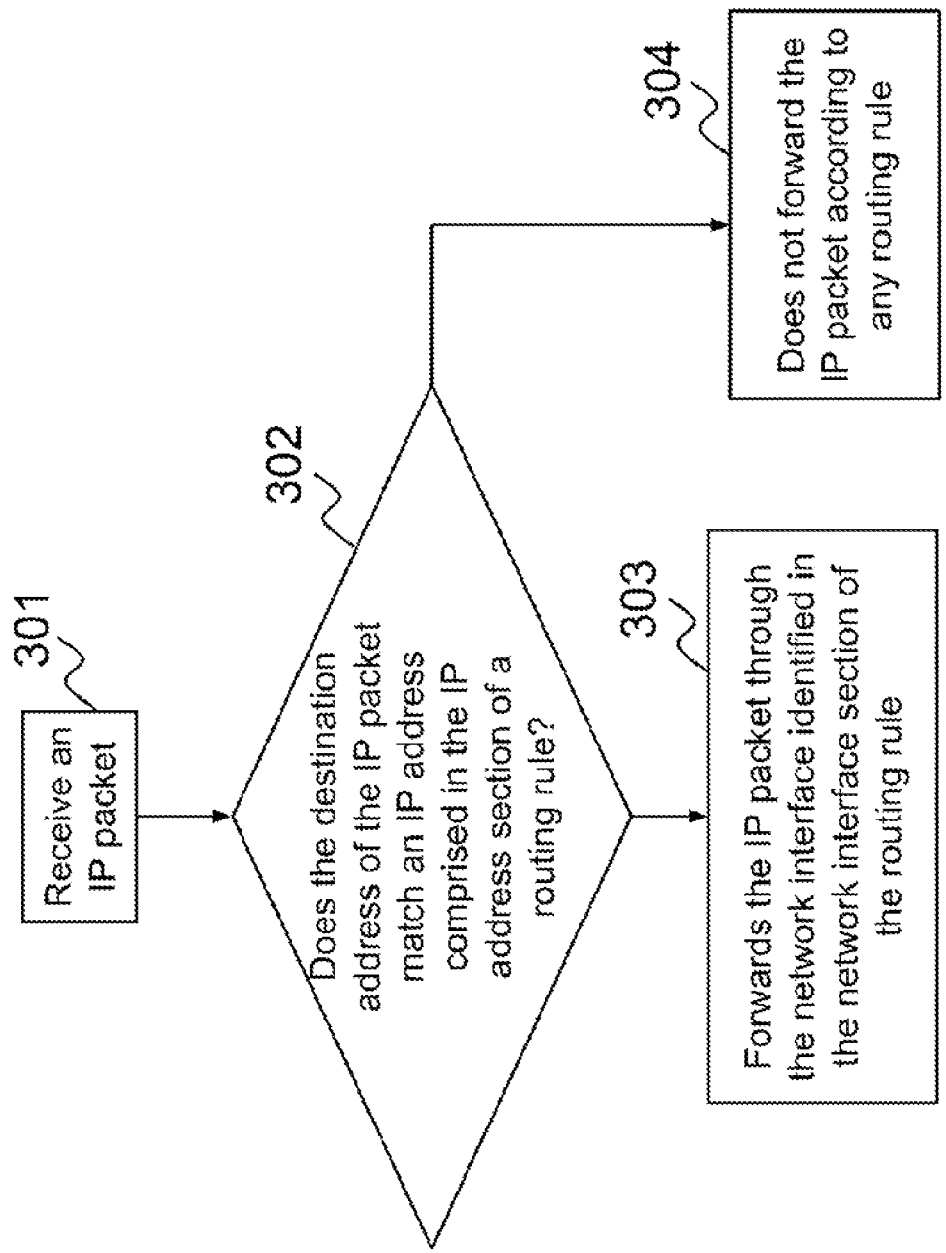

METHODS AND SYSTEMS FOR PROCESSING INTERNET PROTOCOL PACKETS

TECHNICAL FIELD

The present invention relates in general to the field of computer networks. More particularly, the present invention relates to a method performed by a network node for forwarding IP packets according to a first routing rule. The network node determines whether the destination address of the IP packet matches an IP address in the IP address section of a first routing rule. If the destination address of the IP packet matches the IP address in the IP address section of the first routing rule, the network node forwards the IP packet to a second network interface.

BACKGROUND ART

Network interfaces of a router are usually assigned with IP addresses and network mask. Depending on the subnet an IP address belongs to, the router is able to route IP packets to the corresponding network interface. However, as IP address is limited, IP address may be in shortage such that there are not enough IP addresses to be assigned to each network interface.

In order to conserve IP address, drop-in mode has been used to allow a router or gateway to route IP packets without assigning an IP address to the corresponding network interfaces of the router or gateway. Using FIG. 1 as an illustration, network interfaces 171 and 172 are not assigned with IP address. Firewall 150, host 161, network node 164, host 109a and host 109b are assigned with the same IP subnet. When an IP packet is being transmitted by router 111 to host 109a or host 109b, network node 170 routes the IP packet to firewall 150 through network interface 172 as processing unit of network node 170 after examining the destination address of the IP packet determines that the IP packet belongs to the IP subnet connecting to network interface 172. This results in erroneous routing.

Similarly, when network node 164 sends an IP packet to host 109a, network node 170 either drops the IP packet or forwards the IP packet back to firewall 150 as the destination address of the IP packet belongs to the IP subnet that network interface 172 connects to. This also results in erroneous routing.

In order to avoid erroneous routing, one or more routing rules have to be created to allow IP packets sent to and received from hosts and nodes, which belong to same IP subnet of the network connecting to network interface 172, through network interface 171. In addition, it takes time and effort to setup the routing rules manually, especially when many routing rules need to be created manually.

DISCLOSURE OF INVENTION

Summary

According to one of the embodiments of the invention, when a plurality of network interfaces of a network node are assigned with the same first IP address, a first routing rule is created to assist the routing of IP packets. A routing rule comprises an IP address section and a network interface section. In one variant, the first routing rule is assigned with higher priority than a default muting rule. In one variant, the first muting rule is created by a processing unit of the network node and the processing unit learn the one or more IP addresses required for the one or more routing rules by monitoring Address Resolution Protocol (ARP) messages passing through the network node.

According to one of the embodiments of the invention, the first routing rule is updated periodically. In one variant, the first routing rule is updated when one or more IP addresses corresponding to a routing rule have changed.

According to one of the embodiments of the invention, the first routing rule is not executed until a confirmation is received. In one variant, the confirmation is received through a web interface. In one variant, the confirmation is received through a secured connection.

DETAILED DESCRIPTION

The ensuing description provides preferred exemplary embodiment(s) and exemplary embodiments only, and is not intended to limit the scope, applicability or configuration of the invention. Rather, the ensuing description of the preferred exemplary embodiment(s) and exemplary embodiments will provide those skilled in the art with an enabling description for implementing a preferred exemplary embodiment of the invention. It is understood that various changes may be made in the function and arrangement of elements without departing from the spirit and scope of the invention as set forth in the appended claims.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Embodiments, or portions thereof, may be embodied in program instructions operable upon a processing unit for performing functions and operations as described herein. The program instructions making up the various embodiments may be stored in a storage unit, such as a secondary storage.

Moreover, as disclosed herein, the term "secondary storage" and "main memory" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and various other mediums capable of storing, containing or carrying instruction(s) and/or data. A machine-readable medium can be realized by virtualization, and can be a virtual machine readable medium including a virtual machine readable medium in a cloud-based instance.

Furthermore, embodiments may be implemented by hardware, software, firmware, middleware, microcode, hardware description languages, or any combination thereof. When implemented in software, firmware, middleware or microcode, the program instructions or code segments to perform the necessary tasks may be stored in a machine readable medium such as storage unit. A processing unit(s) may perform the necessary tasks. A processing unit(s) can be a CPU, an ASIC semiconductor chip, a semiconductor chip, a logical unit, a digital processor, an analog processor, a FPGA or any processor that is capable of performing logical and arithmetic functions. A program instruction may represent a procedure, a function, a subprogram, a program, a routine, a subroutine, a module, a software package, a class, or any combination of instructions, data structures, or program statements. A program instruction may be coupled to another program instruction or a hardware circuit by passing and/or receiving information, data, arguments, parameters, or memory contents. Information, arguments, parameters, data. etc. may be passed, forwarded, or transmitted via any suitable means including memory sharing, message passing, token passing, network transmission, etc. A processing unit(s) can be realized by virtualization, and can be a virtual processing unit(s) including a virtual processing unit in a cloud-based instance.

A network interface may be implemented by a standalone electronic component or may be integrated with other electronic components. A network interface may have no network connection or at least one network connection depending on the configuration. A network interface is only connected to one accessible network. Therefore, there may be more than one network connection being carried by one accessible network. A network interface may be an Ethernet interface, a frame relay interface, a fibre optic interface, a cable interface, a DSL interface, a token ring interface, a serial bus interface, a universal serial bus (USB) interface, Firewire interface, Peripheral Component Interconnect (PCI) interface, etc.

Embodiments, or portions thereof, may be embodied in a computer data signal, which may be in any suitable form for communication over a transmission medium such that it is readable for execution by a functional device (e.g., processing unit) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The program instructions may, in certain embodiments, be downloaded via computer networks such as the Internet, an intranet, LAN, MAN, WAN, the PSTN, a satellite communication system, a cable transmission system, and/or the like.

A network node may work as a gateway, router, and a mobile device. A network node can be realized by virtualization, and can be virtual network node.

FIG. 5 is an illustrative block diagram of a network node, such as network node 170, according to one of the embodiments of the present invention. Network node 170 comprises processing unit 501, main memory 502, system bus 503, secondary storage 504, and network interfaces 171, 172, and 173. Processing unit 501 and main memory 502 are connected to each other directly. System bus 503 connects processing unit 501 directly or indirectly to secondary storage 504, and network interfaces 171, 172, and 173. Using system bus 503 allows network node 170 to have increased modularity. System bus 503 couples processing unit 501 to secondary storage 504, and network interfaces 171, 172, and 173. System bus 503 can be any of several types of bus structures including a memory bus, a peripheral bus, and a local bus using any of a variety of bus architectures. Secondary storage 504 stores program instructions for execution by processing unit 501. The scope of the invention is not limited to network node 170 having three network interfaces, such that network node 170 may have more network interfaces. Network interfaces 171, 172, and 173 are specified for illustration purposes only.

FIG. 1 illustrates a network environment in which network node 170 operates according to one of the embodiments of the present invention operates. Network node 170 is connected to: firewall 150 through network interfaces 172 and 151; switch 105 through network interfaces 171 and 107; and router 111 through network interfaces 173 and 112. One of network interfaces 171 and 172 is assigned with the same IP address or both network interface 171 and 172 are not assigned with IP address. Router 101, firewall 150, host 161, network node 164, host 109a and host 109b are in a first IP subnet. Therefore the IP addresses of network interface 103, 141a, 141b, 151, 152, 153, 162, and 163 are assigned with IP addresses belonging to the first IP subnet. Processing unit 501 forwards or routes the received IP packets according to a first routing rule.

The first routing rule is a routing rule. A routing rule has at least two sections. The first section is an IP address section and is used to indicate one or more IP addresses or IP address range. The second section is network interface section and is used to indicate the identity of a network interface of network node 170. An identity could be a string, a number, or any information that allows processing unit 502 to associate with a network interface of the network node. There could be more than one routing rule. In one variant, muting rules are stored in a storage unit of network node 170, such as secondary storage 504 or main memory 502. FIG. 3 illustrates a flowchart conceptually showing the flow of the operations of the network node 170 according to one of the embodiments of the present invention. When an IP packet has arrived at network node 170 at step 301, processing unit 501 examines the destination address of the IP packet to check whether the destination address matches an IP address indicated in the first section of any of the routing rules at step 302. If destination address of the IP packet matches an IP address or is within an IP address range indicated in the IP address section of a routing rule, processing unit 501 forwards the IP packet through the network interface indicated in the network interface section of the same routing rule at step 303. Otherwise, processing unit 501 does not forward the IP packet according to any routing rule at step 304.

When there is no routing rule that has the IP address indicated in the IP address section, processing unit 501 does not forwards the IP packet according to any routing rule.

In one variant, if there is no routing rule has the IP address indicated in the IP address section, processing unit 501 forwards the IP packet through a network interface corresponding to routes discovered through exchanging routing protocol with other routers.

In one variant, if there is no muting rule has the IP address indicated in the IP address section, processing unit 501 forwards the IP packet according to a default routing rule.

FIG. 2A illustrates the structure of a routing rule which comprises IP address section 201 and network interface section 202. IP address section 201 contains IP address information corresponding to an IP address, a group of IP address or a range of IP addresses. The IP address information also contains IP subnet information. The IP address can be IP version 4 or IP version 6. For example, a second routing rule comprises an IP version 4 address with the corresponding IP subnet mask and an IP version 6 address with the corresponding IP subnet mask in IP address section 201. In one variant, the IP subnet information is contained in another field of the routing rule, instead of within the IP address section. Network interface section 202 indicates the network interface used to forward IP packets that has destination address matching the IP address(es) in the IP address section 201.

In one variant, if there is no IP subnet information in the IP address section, the IP subnet is assumed to only contain one IP address. Hence, the IP subnet mask 255.255.255.255 is used for IP version 4 in the routing rule.

FIG. 2B illustrates an example of two routing rules. The routing rule comprising IP address section 211 has two IP addresses, i.e. 210.1.10.4 and 210.1.10.5 with the corresponding IP subnet masks 255.255.255.255 and 255.255.255.255 respectively and the network interface section 212 has First Network Interface. First Network Interface is the identity of a network interface, such as network interface 171.

The routing rule comprising IP address section 221 has IP address 210.1.2.1 with the corresponding IP subnet mask 255.255.255.0 and the network interface section 222 has Third Network Interface. Third Network Interface is the identity of a network interface, such as network interface 172. As the IP subnet masks for 210.1.10.4 and 210.1.10.5 in IP address section 211 are both 255.255.255.255, this means that IP packets with destination addresses as 210.1.10.4 or 210.1.10.5 are forwarded through network interface 171. Similarly, as the IP subnet masks for 210.1.2.1 in IP address section 221 is 255.255.255.0, this means that IP packets with destination addresses from 210.1.2.1 to 210.1.2.255 are forwarded through network interface 3.

The first routing rule has higher priority than the default routing rule. As a result, processing unit 501 will first examine a received IP packet using the first routing rule and then followed by the default routing rule. The first routing rule should have IP addresses of network interface of hosts and/or nodes to which the default routing rule should not be applied.

When there is a plurality of routing rules in addition to the default routing rule, there could be possibility that one or more IP addresses is contained in more than one IP address section of a plurality of routing rules. In one variant, each routing rule has a unique priority. Routing rules are ranked according to the priority. When an IP address is contained in more than one IP address section of a plurality of routing rules, the highest ranking routing rule should be executed. In one variant, the unique priority is assigned automatically according to a timestamp that routing rules are ranked according to the time the routing rules are entered to network node 170.

For those who skilled in the arts, they would appreciate that the default routing rule could be a data table stored in secondary storage 504 or main memory 502 of network node 170 that lists the routes to particular network destinations, like a routing table. The default routing rule can be entered specifically by a user or an administrator of network node 170, created automatically by processing unit 501, created automatically by processing unit 501 by exchanging routing information with other routers, and/or created automatically by processing unit 501 with information entered by a user or an administrator of network node 170.

First Routing Rule and Default Routing Rule

For example, the IP address of network interfaces 102, 103, 112, 113, 141a, 141b, 151, 152, 153, 162, 163 are assigned according to the table below. For the purpose of easy references, all embodiments of the present invention when referring to FIG. 1 adapt the IP address assignment according to the table below.

TABLE 1

| Network interface | IP address | Network Mask |
|---|---|---|
| 102 | 100.10.10.1 | 255.255.255.255 |
| 103 | 210.10.10.3 | 255.255.255.0 |
| 112 | 100.1.1.2 | 255.255.255.0 |
| 113 | 100.1.1.1 | 255.255.255.0 |
| 141a | 210.10.10.4 | 255.255.255.0 |
| 141b | 210.10.10.5 | 255.255.255.0 |
| 151 | 210.10.10.6 | 255.255.255.0 |
| 157 | 210.10.10.7 | 255.255.255.0 |
| 153 | 210.10.10.8 | 255.255.255.0 |
| 162 | 210.10.10.9 | 255.255.255.0 |
| 163 | 210.10.10.10 | 255.255.255.0 |

The default routing rule is to forward all IP packets with destination address belonging to the IP subnet of firewall 150, which is 210.10.10.6/255.255.255.0, through network interfaces 172 and 151 regardless which network interface the IP packets are received from. The effect of the first routing rule is to forward IP packets with destination address of the IP addresses of network interface 141a and 141b through network interface 171.

The reason for having the first routing rule is to allow host 161 and network node 164 to be able to communicate with hosts 109a and 109b through IP protocol. Without the first routing rule, network node 170 does not forward IP packets with destination address belonging to IP subnet 210.10.10.6/255.255.255.0 through network interface 171 because of the default routing rule.

For illustration purpose, when network node 170 receives an IP packet with destination address of network interface 162, i.e. 210.10.10.9, through network interface 173, processing unit 501 forwards the IP packet to network interface 172 according to the default routing rule. Similarly, when network node 170 receives an IP packet from network interface 173 and the destination IP address of the received IP packet is the IP address of network interface 141a of host 109a, network node 170 forwards the IP packet according to the first routing rule. Similarly, when network node 170 receives an IP packet from network interface 172 and the destination IP address of the received IP packet is the IP address of network interface 141b of host 109b, network node 170 forwards the IP packet according to the first muting rule.

When network node 170 receives an IP packet through network interface 172 and the destination IP address of the received IP packet is not in the IP subnet of 210.10.10.1/255.255.255.0, the first routing rule and the default routing rule do not apply. If the destination IP address is reachable through both routers 101 and 111, those skilled in the arts would appreciate that processing unit 501 can have many methods to determine which of the network interface 171 or 173 for forwarding the IP packet, such as network performance, routing policy, muting table and link loading techniques.

If the destination IP address of the received IP packet is only reachable through router 101, a second routing rule is required to have processing unit 501 to forward the IP packet through network interface 171. In the IP address section of the second routing rule, an IP address, an IP address range or an IP address subnet is required. The identity of network interface 171 is required in the network interface section of the second routing rule. Similarly, if the destination IP address of the received IP packet is only reachable through muter 111, a third routing rule is required to have the processing unit 501 to forward the IP packet through network interface 173. In the IP address section of the third routing rule, an IP address, an IP address range or an IP address subnet is required. The identity of network interface 173 is required in the network interface section of the third routing rule.

Preferably, information corresponding to the routing rules is stored in a storage unit of network node 170, such as secondary storage 504 or main memory 502, to allow processing unit 501 to easily access the routing rule information.

Routing Rules

The number of routing rules is not limited. For example, there could be ten routing rules and each of the routing rules is corresponding to one IP address. The more routing rules there are, the more computing resources processing unit 501 needs to examine whether the destination address of a received IP packet belongs to one of the IP address of the routing rules. If there are too many routing rules, processing unit 501 may take a longer time to determine which routing rules to apply. More storage resources may also be required for storing routing rules.

An IP address should not appear more than once in IP address sections of different muting rules as this could make processing unit 501 unable to identify the correct network interface to forward received IP packets. In one variant, additional section is required in the routing rule if the same IP address is allowed for different routing rules. The additional section may comprise port number, source address and other information can be identified from the received IP packets. In one variant, there are separate sections for each kind of information, where the sections may include a port number section for port number, a source address section for the source address, and other sections for other information that can be identified from the received IP packets. For example, there is a first routing rule with the network interface as the identity of network interface 171 in the network interface section. The first routing rule has an IP address section, a port number section and a source address section. For an IP packet to be forwarded through network interface 171 according to the first routing rule, the destination address, port number, and source address of the IP packet must match the destination address, port number and source address specified in the IP address section, port number section and source address section of the first routing rule respectively.

IP Address in the IP Address Section

According to one of the embodiments of the invention, the one or more routing rules are entered by a user or an administrator of network node 170. Those skilled in the arts would appreciate that there are many methods to enter information to network node 170. For example, the user or the administrator can enter the one or more routing rules through a web page, a command line interface or software.

According to one of the embodiments of the invention, the routing rules are created by processing unit 501 of network node 170. Network node 170 learns the IP address of hosts and nodes directly or indirectly connected to its network interface by monitoring Address Resolution Protocol (ARP) related packets passing through it. When network node 170 receives an Ethernet frame from one of its network interface, processing unit 501 of network node 170 examines whether the Ethernet frame contains an ARP message. If so, processing unit 501 uses the IP address of the network interface receiving the Ethernet frame to create a corresponding routing rule.

When host 109a sends an ARP message announcing that the IP address of network interface 141a is 210.10.10.4 through network interface 141a and if network node 170 receives the ARP message carried by an Ethernet frame through network interface 171, processing unit 501 of network node 170 is then able to determine that network interface 141a is reachable through network interface 171. Therefore, processing unit 501 creates a routing rule with the IP address as 210.10.10.4 in the IP address section and the network interface as the identity of network interface 171 in the network interface section. Similarly, when network node 164 broadcasts an ARP message through network interface 163 with information that the IP address of network interface 163 is 210.10.10.10, processing unit 501 is able to learn the IP address of network interface 163 when the ARP message passing through network node 170 through network interface 172. Then processing unit 501 creates another routing rule with the IP address as 210.10.10.10 in the IP address section and the network interface as the identity of network interface 172 in the network interface section.

As new hosts and nodes may join or leave networks connecting to network node 170, IP addresses learnt through ARP messages may become outdated or need to be updated, processing unit 501 updates routing rules with new IP address(es) learnt from ARP messages. In one variant, when no ARP message originated from a network interface of a host or node has been received within a predefined time, processing unit 501 removes the IP address, IP subnet mask and network interface identity from the corresponding routing rule. In one variant, processing unit 501 periodically sends out ARP message to request for answer(s) for IP address(es) in IP address section(s) of the muting rule(s) it has. This allows processing unit 501 to update its routing rule.

Preferably, when processing unit 501 creates routing rules automatically, each routing rule corresponds to one IP address only because processing unit 501 is not able to know the range of IP addresses that can be reachable through a network interface from ARP messages. Therefore, the IP subnet mask in the IP address section is set to allow one IP address only, such as IP subnet mask 255.255.255.255 for IP version 4.

Gateway

According to one of the embodiments of the present invention, network node 170 performs as a gateway for firewall 150. Network interface 172 is a local area network CLAN) interface and network interfaces 171 and 173 are wide area network (WAN) interfaces. Processing unit 501 considers all network nodes or hosts connected through network interface 172 belong to the same LAN and therefore have the same subnet, such as the first subnet. Those who skilled in the arts would appreciate that there are circumstances that hosts and/nodes connected through network interface 172 may not belong to the same subnet, such as Virtual LAN (VLAN). FIG. 4A illustrates a flowchart conceptually showing the flow of the operations of the network node 170 when network node 170 performs as a gateway and receives an IP packet from the LAN interface. At step 401, network node 170 receives an IP packet through network interface 172. At step 402, processing unit 501 examines whether the destination address of the IP packet matches an IP address in the IP address section of a routing rule. If there is a routing rule in which the destination address of the IP packet matches an IP address in the IP address section, processing unit 501 forwards the IP packet through the WAN interface identified in the network interface section of the routing rule corresponding to the destination address of the IP packet at step 403.

If there is no routing rule in which the destination address of the IP packet match an IP address in the IP address section, in step 404, processing unit 501 determines whether the destination address of the IP packet matches the IP subnet of the network that the LAN interface connects to. If so, processing unit 501 does not forward the IP packet further in step 406 as processing unit 501 considers all hosts and/nodes belonging to the IP subnet can only be connected through network interface 172. Otherwise, processing unit 501 forwards the IP packet through one of the WAN interfaces, such that the IP packet should be able to reach the destination at step 405. Those skilled in the arts would appreciate that processing unit 501 can have many methods to determine which of the WAN interfaces should be used for forwarding the IP packet, such as network performance, routing policy, routing table and link loading techniques. If there is only one WAN interface, processing unit 501 forwards the IP packet through the WAN interface.

FIG. 4B illustrates a flowchart conceptually showing the flow of the operations of the network node 170 when network node 170 performs as a gateway and receives an IP packet from the WAN interface. At step 411, network node 170 receives an IP packet through a WAN interface. For example, network node 170 receives the IP packet through network interface 171. At step 412, processing unit 501 examines whether the destination address of the IP packet matches an IP address in the IP address section of a routing rule. If there is a routing rule in which the destination address of the IP packet matches an IP address in the IP address section, processing unit 501 further determines whether the destination address is reachable through network interface 171, which is the same WAN interface the IP packet received from. If so, processing unit 501 does not forward the IP packet further because the IP packet is received from the same WAN interface at step 418. Otherwise processing unit 501 forwards the IP packet to the destination stated in the network interface section of the routing rule at step 417.

At step 414, processing unit 501 determines whether the destination address of the IP packet belongs to an IP subnet of a LAN network that the LAN interface connects to. If so, processing unit 501 forwards the IP packet through the LAN interface at step 415. Otherwise processing unit 501 does not forward the IP packet to any of its network interfaces in step 416.

In order for processing unit 501 of network node 170, which is performing as a gateway, to create a routing rule for network interface 141*a* and/or 141*b* automatically, processing unit 501 learns the IP address and identity of network interface receiving the IP packet through ARP messages. Further through ARP message, processing unit 501 can learn the Ethernet MAC address of the sender of the IP packet containing the ARP message. When network node 170 receives an ARP message from firewall 150 through network interface 172, processing unit 501 can forward the same ARP message to hosts 141*a* and 141*b* through network interface 171, or can perform as a ARP proxy to send another ARP message to hosts 109*a* and 109*b* to find the IP address and/or MAC address of network interfaces 141*a* and 141*b*. Similarly when processing unit 501 has received ARP messages from network interface 141*a* and/or 141*b*, processing unit 501 can forward the ARP messages to firewall 150 or reply to hosts 109*a* and/or 109*b* as an ARP proxy. Those skilled in the art would appreciate that there are many methods for network node 170 performing as a gateway to handle ARP messages in order to improve responding time, reduce network traffic, and to keep IP address and MAC address records updated.

In one variant, only ARP messages received through WAN interface(s) are monitored for the purpose of creating a routing rule(s). In addition, only IP address(es) belonging to an IP subnet of the network connecting to the WAN interface can be used in the IP address section of the routing rule. This is because the IP address(es) is normally to be reached through the LAN interface according to default routing rule. The routing rule is used to allow the IP address(es) be reached through the WAN interface. As a result, ARP messages received through LAN interface(s) are not required to be monitored.

Using FIG. 1 for illustration and IP address assignment in Table 1, ARP messages originated from network interfaces 141*a* and 141*b* are monitored by network node 170 in order to learn the IP addresses of network interface 141*a* and 141*b*. As these ARP messages are received through network interface 171, processing unit 501 is able to create a routing rule based on the IP addresses learned for IP address section and network interface 171 for the network interface section. Processing unit 501 only uses the IP addresses of network interfaces 141*a* and 141*b*, i.e. 210.10.10.4 and 210.10.10.5, for creating the network muting rule because they have the same IP subnet with the network connecting to network interface 172 but only reachable through network interface 171, which is a WAN interface. The IP subnet masks for these two IP addresses in the IP address section are both 255.255.255.255 as the IP address learnt from ARP messages is for specific network interface. ARP messages received through network interface 172 are not required to be monitored because processing unit 501 does not create a routing rule for network interfaces 151, 152, 153, 162 and 163 automatically because network interfaces 151, 152, 153, 162 and 163 can be reached through LAN interface. However, preferably, ARP messages received through network interface 172 should also be monitored because a host or a node may be moved from the WAN side to the LAN side and the corresponding routing rule then needs to be updated.

According to one of the embodiments of present invention, one of network interfaces 171 and 172 is assigned with an IP address and the other network interface is not assigned with an IP address. The default routing rule and routing rules still apply. For example, network interface 171 is assigned with IP address 210.10.10.11 and other network interfaces in FIG. 1 is assigned according to the assignment listed in Table 1. In addition, IP address 210.10.10.11 and IP addresses assigned to network interfaces 151, 152, 153, 162 and 163 belong to the same IP subnet, for example, 210.10.10.1/0. As processing unit 501 is aware that network interface 171 is assigned with IP address 210.10.10.11, it does not forward IP packets with destination address belonging to IP address 210.10.10.11 through network interface 172 even when the default routing rule is to forward IP packets belonging to the subnet 210.10.10.1/0.

According to one of the embodiments of present invention, as new hosts and nodes may join or leave the network connected to network interface 171, and IP addresses learnt through ARP messages may become outdated or need to be updated, processing unit 501 updates routing rules with new IP address(es) learnt from ARP messages and/or network interface identity according to the network interface receiving the ARP messages. For example, hosts 109*a* may be moved from connecting to switch 105 to connecting to firewall 150. Therefore, the network interface receiving ARP message from hosts 109*a* should have been changed from network interface 171 to network interface 172. Then processing unit 501 can either delete the routing rule if the default routing rule is to forward IP packets belonging to the subnet 210.10.10.1/0 through network interface 172 or update the network interface section of the routing rule to network interface 172. In other example, there is a new node connecting to switch 105 with IP address 210.10.10.11 and IP subnet mask 255.255.255.0. Therefore, processing unit 501 can create a new routing rule comprising IP address section with IP address 210.10.10.11 and IP subnet mask 255.255.255.0 and network interface section with the identity of network interface 172. In one variant, if there is already a muting rule comprising network interface section with the identity of network interface 172, processing unit 501 can add IP address 210.10.10.11 and IP subnet mask 255.255.255.0 to the IP section of that routing rule. Using an existing routing rule instead of creating a new muting rule may result in more efficient use computing and storage resources.

In one variant, when no ARP message originated from a network interface of a host or node has not been received within a predefined time, processing unit 501 removes the IP address, IP subnet mask and network interface identity from the corresponding routing rule or delete the routing rule if there is no other IP address in the routing rule. In one variant, processing unit 501 periodically sends out ARP message to request for answer(s) for IP address(es) in IP address section(s) of the routing rule(s) it has. This allows processing unit 501 to update its routing rule.

In one variant, all routing rules are removed periodically. Then processing unit 501 creates routing rules again automatically by monitoring ARP messages as describe above. Preferably, when processing unit 501 is about to remove a routing rule, processing unit 501 sends out an ARP message to request answer(s) for IP address(es) indicated in the IP address section of the routing rule. Then processing unit 501 can create a new routing rule quickly with ARP message replied by host(s) or node(s) which is(are) assigned with the IP address(es).

According to one of the embodiments of the invention, before a routing rule is stored, an administrator of the network node 170 is asked to confirm whether the IP address and network interface identity are to be used for creating the routing rule. Therefore, the administrator has a chance to modify, add or delete information associated with the routing rule. In one variant, the administrator can confirm, modify, add or delete routing rule through a user interface. In one variant, the communication between the administrator and network node 170 is through a secured connection. In one variant, the routing rules are uploaded and downloaded to a remote server for central management. Therefore, the administrator can manage the routing rules through a server.

According to one of the embodiments of the invention, routing rule is not executed until receiving a confirmation. In one variant, the confirmation is received through a web interface. In one variant, the confirmation is received through a secured connection.

According to one of the embodiments of the invention, one or both of network interfaces 171 and 172 is assigned with IP addresses. When network node 170 receives IP packets from one of its network interfaces with destination address the same as the assigned IP address(es), processing unit 501 intercepts the IP packets and does not forward the IP packets. In one variant, the assigned IP addresses are for management purpose so that network node 170 can be contacted using these assigned IP address(es). When a host or node from the LAN side communicates with network node 170 through the assigned IP address(es), processing unit 501 recognizes the assigned IP address(es) and responds. Therefore, the assigned IP address(es) can be any IP address as long as it does not create IP address conflicts in the LAN. Similarly, a host or node from the WAN side, i.e. network interfaces 171 and 173, can communicate with network node 170 through the assigned IP address(es).

BRIEF DESCRIPTION OF DRAWINGS

FIG. 3 illustrates a flowchart conceptually showing the flow of the operations of a network node according to one of the embodiments of the present invention.

Figure 1:
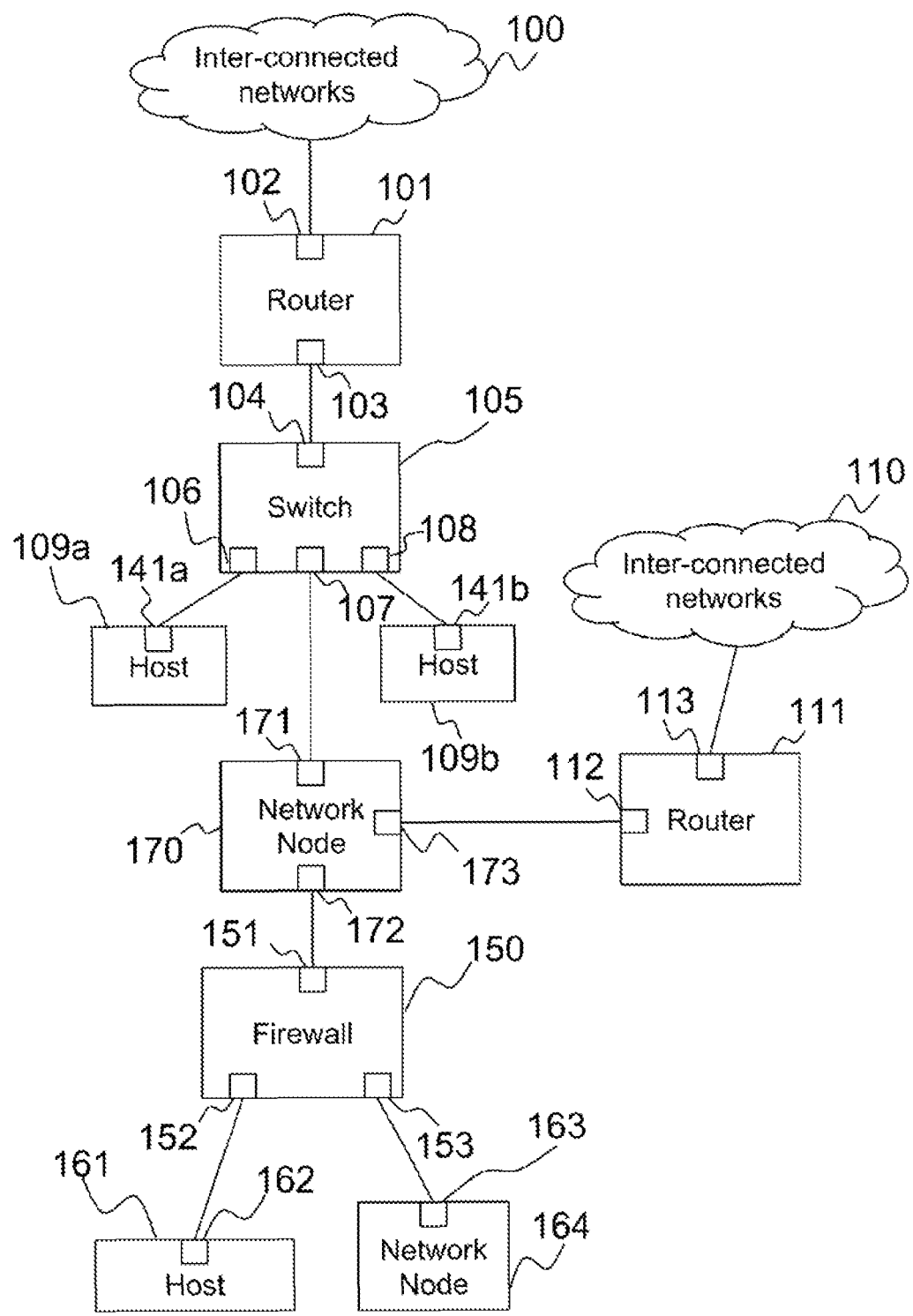
FIG. 1 illustrates a network environment in which a network node operates according to one of the embodiments of the present invention.
Figure 2A:
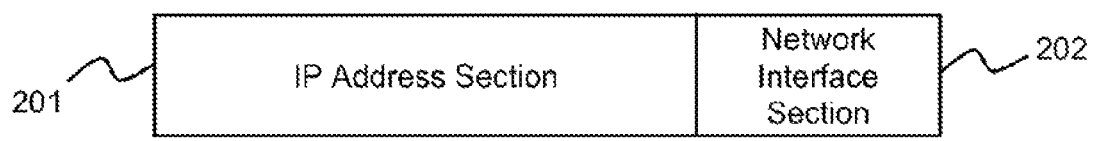
FIG. 2A illustrates the structure of a routing rule which comprises an IP address section and a network interface section according to one of the embodiments of the present invention.
Figure 2B:
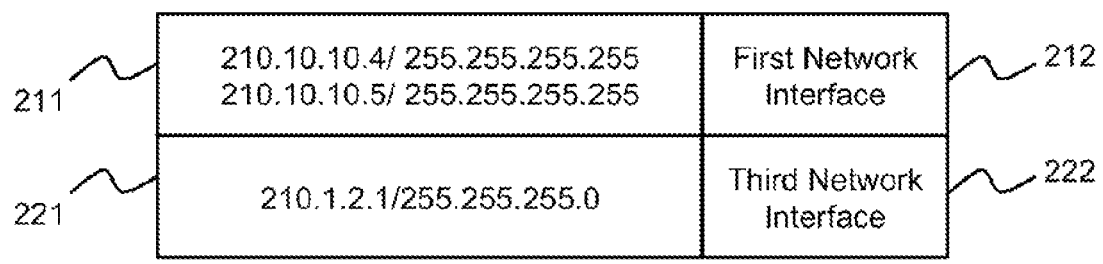
FIG. 2B illustrates an example of two routing rules according to one of the embodiments of the present invention.
Figure 4A:
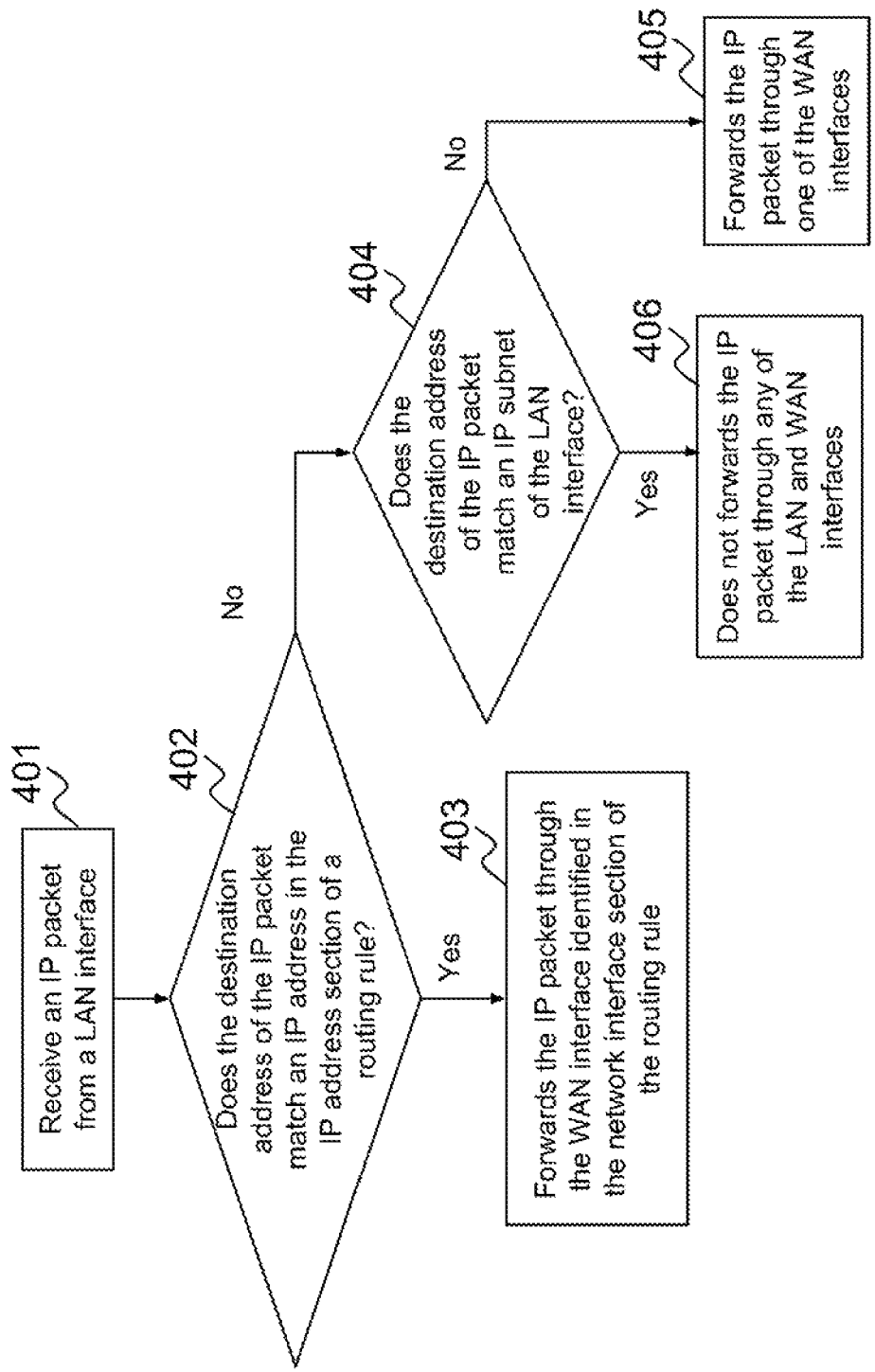
FIG. 4A illustrates a flowchart conceptually showing the flow of the operations of a network node when the network node performs as a gateway and receives an IP packet from a LAN interface according to one of the embodiments of the present invention.
Figure 4B:
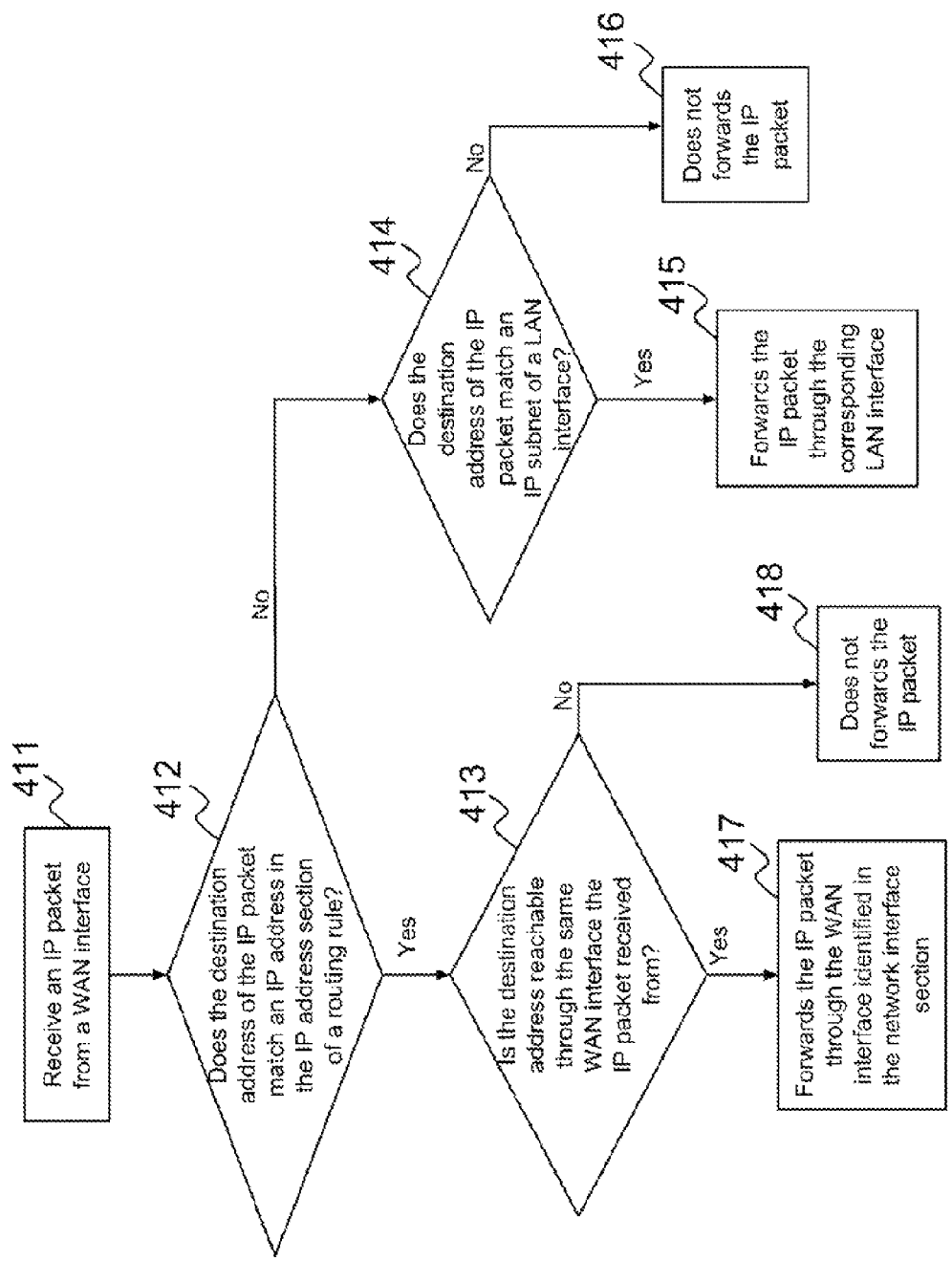
FIG. 4B illustrates a flowchart conceptually showing the flow of the operations of a network node when the network node performs as a gateway and receives an IP packet from a WAN interface according to one of the embodiments of the present invention.
Figure 5:
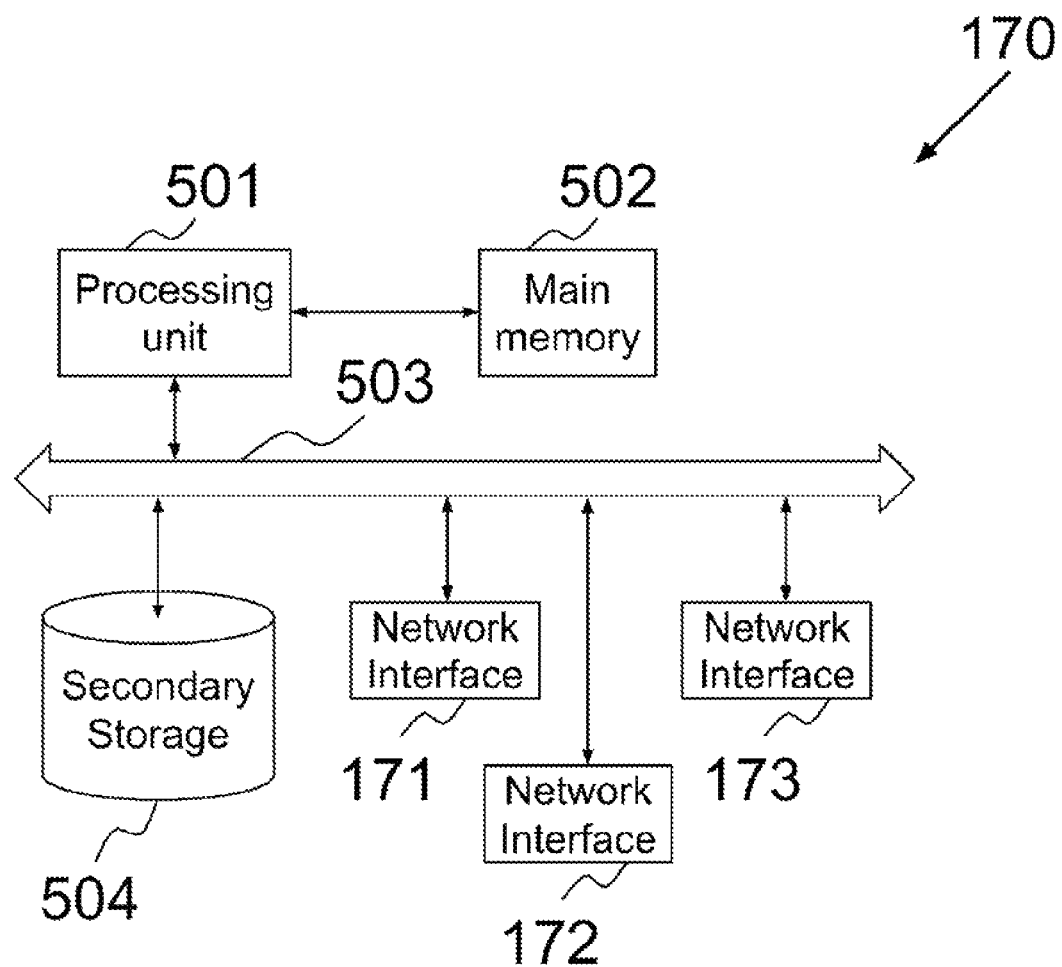
FIG. 5 is an illustrative block diagram of a network node according to one of the embodiments of the present invention.

The invention claimed is:

1. A method performed by a network node used in a network system for forwarding IP packets, wherein the network node performs the steps of:
  (a) receiving an IP packet from a first network interface;
  (b) determining whether the destination address of the IP packet matches an IP address in the IP address section of a first routing rule;
  (c) forwarding the IP packet through a second network interface if the destination address of the IP packet matches the IP address in the IP address section of the first routing rule;
  (d) when the first network interface is a local area network (LAN) interface and destination address of the IP packet does not match the IP address in the IP address section of the first routing rule:
    (i) determining whether the destination address of the IP packet matches an IP subnet of a local area network (LAN) interface of the network node;
    (ii) not forwarding the IP packet if the destination address of the IP packet matches the IP subnet of the LAN interface of the network node;
    (iii) forwarding the IP packet through a wide area network (WAN) interface of the network node if the IP packet does not match the IP subnet of the LAN interface of the network node;
  (e) when the first network interface is a WAN interface and the destination address of the IP packet matches an IP address in the IP address section of the first routing rule:
    (i) forwarding the IP packet through a WAN interface identified in the first routing rule if the destination address is reachable through the first network interface;

(ii) not forwarding the IP packet if the destination address is not reachable through the first network interface;
(f) when the first network interface is a WAN interface and the destination address of the IP packet does not match an IP address in the IP address section of the first routing rule:
(i) forwarding the IP packet through a LAN interface if the destination address of the IP packet matches an IP subnet of the LAN interface;
(ii) not forwarding the IP packet if the destination address of the IP packet does not match an IP subnet of the LAN interface;
wherein one or both of the first network interface and second network interface is not assigned with an IP address;
wherein the network node comprises at least three network interfaces;
wherein the first routing rule comprises at least one IP address section and at least one network interface section.

2. The method of claim 1, further comprising:
forwarding the IP packet through a third network interface if the destination address of the IP packet matches the IP address of a default routing rule; and
wherein the first routing rule has a higher priority than the default muting rule.

3. The method of claim 1, wherein information for the IP address section and network interface section of the first routing rule is entered manually.

4. The method of claim 1, wherein information for the IP address section and network interface section of the first routing rule is determined by a processing unit of the network node.

5. The method of claim 4, wherein information for the IP address section and network interface section of the first routing rule is determined by a processing unit of the network node based on, at least in part, Address Resolution Protocol (ARP) messages received by the network node.

6. The method of claim 5, further comprising updating the first routing rule periodically.

7. The method of claim 1, further comprising forwarding the IP packet through a fourth network interface corresponding to routes discovered through exchanging routing protocol with other routers when there is no routing rule indicating the destination address in the IP address section.

8. The method of claim 1, wherein the default routing rule is to forward all IP packets with destination address belonging to IP subnet of a network connected to the LAN interface through the LAN interface; and
wherein the first routing rule is to forward all IP packets with destination address belonging to one or more IP addresses specified in the IP address section of the first routing rule through the WAN interface.

9. The method of claim 8, wherein the one or more IP addresses specified in the IP address section of the first routing rule belong to same IP subnet of a network connected to the LAN interface.

10. The method of claim 9, wherein the one or more addresses specified in the IP address section of the first routing rule are determined by a processing unit of the network node based on, at least in part, ARP messages received by the network.

11. A network node used in a network system for forwarding IP packets, wherein the network node comprising:
at least three network interfaces;
at least one processing unit;
at least one storage unit storing program instructions executable by the at least one processing unit for:
(a) receiving an IP packet from a first network interface;
(b) determining whether the destination address of the IP packet matches an IP address in the IP address section of a first routing rule;
(c) forwarding the IP packet through a second network interface if the destination address of the IP packet matches the IP address in the IP address section of the first routing rule;
(d) when the first network interface is a local area network (LAN) interface and destination address of the IP packet does not match the IP address in the IP address section of the first routing rule:
(i) determining whether the destination address of the IP packet matches an IP subnet of a local area network (LAN) interface of the network node;
(ii) not forwarding the IP packet if the destination address of the packet matches the IP subnet of the LAN interface of the network node;
(iii) forwarding the IP packet through a wide area network (WAN) interface of the network node if the IP packet does not match the IP subnet of the LAN interface of the network node;
(e) when the first network interface is a WAN interface and the destination address of the IP packet matches an IP address in the IP address section of the first routing rule:
(i) forwarding the IP packet through a WAN interface identified in the first routing rule if the destination address is reachable through the first network interface;
(ii) not forwarding the IP packet if the destination address is not reachable through the first network interface;
(f) when the first network interface is a WAN interface and the destination address of the IP packet does not match an IP address in the IP address section of the first routing rule:
(i) forwarding the IP packet through a LAN interface if the destination address of the IP packet matches an IP subnet of the LAN interface;
(ii) not forwarding the IP packet if the destination address of the IP packet does not match an IP subnet of the LAN interface;
wherein one or both of the first network interface and second network interface is not assigned with an IP address;
wherein the network node comprises at least three network interfaces;
wherein the first routing rule comprises at least one IP address section and at least one network interface section.

12. The network node of claim 11 wherein the at least one storage unit further storing program instructions executable by the at least one processing unit for:
forwarding the IP packet through a third network interface if the destination address of the IP packet matches the IP address of a default muting rule; and
wherein the first routing rule has a higher priority than the default routing rule.

13. The network node of claim 11, wherein information for the IP address section and network interface section of the first routing rule is entered manually.

14. The network node of claim 11, wherein information for the IP address section and network interface section of the first routing rule is determined by the at least one processing unit of the network node.

15. The network node of claim 14, wherein information for the IP address section and network interface section of the first routing rule is determined by a processing unit of the network node based on, at least in part, Address Resolution Protocol (ARP) messages received by the network node.

16. The network node of claim 15, wherein the at least one storage unit further storing program instructions executable by the at least one processing unit for updating the first routing rule periodically.

17. The network node of claim 11, wherein the at least one storage unit further storing program instructions executable by the at least one processing unit for forwarding the IP packet through a fourth network interface corresponding to routes discovered through exchanging routing protocol with other routers when there is no routing rule indicating the destination address in the IP address section.

18. The network node of claim 11, wherein the default routing rule is to forward all IP packets with destination address belonging to IP subnet of a network connected to the LAN interface through the LAN interface; and wherein the first routing rule is to forward all IP packets with destination address belonging to one or more IP addresses specified in the IP address section of the first routing rule through the WAN interface.

19. The network node of claim 18, wherein the one or more IP addresses specified in the IP address section of the first routing rule belong to same IP subnet of a network connected to the LAN interface.

20. The network node of claim 19, wherein the one or more IP addresses specified in the IP address section of the first routing rule are determined by a processing unit of the network node based on, at least in part, ARP messages received by the network.

* * * * *